United States Patent [19]

Murakami

[11] 3,850,273
[45] Nov. 26, 1974

[54] BRAKE CONTROLLED PRESSURE MODULATING CLUTCH VALVE

[75] Inventor: Noboru Murakami, Nagoya, Japan

[73] Assignee: Aisin Seiki Kabushiki Kaisha, Kariya-shi, Aichi-ken, Japan

[22] Filed: Sept. 17, 1973

[21] Appl. No.: 397,920

[30] Foreign Application Priority Data
Sept. 19, 1972 Japan............................ 47-93911

[52] U.S. Cl. ......... 192/4 A, 192/109 F, 137/505.15
[51] Int. Cl............................................ B60k 29/02
[58] Field of Search ............ 192/109 F, 87.19, 4 A, 192/4 C

[56] References Cited
UNITED STATES PATENTS
2,814,371  11/1957  Bolster et al. ............... 192/109 F X
3,042,165  7/1962  Yokel.......................... 192/109 F X
3,583,422  6/1971  Dach .......................... 192/109 F X
3,621,955  11/1971  Black.......................... 192/109 F X
3,696,897  10/1972  Kitano et al................. 192/109 F X Primary Examiner—Benjamin W. Wyche
Attorney, Agent, or Firm—Berman, Bischoff & Platt

[57] ABSTRACT

An inching control system for controlling the fluid pressure to be applied to the fluid-actuated clutch engaging mechanisms of an industrial vehicle in response to the braking operation. In the control system, a modulator valve for controlling the fluid pressure to be applied to the clutch engaging mechanisms in manual shifting operation is designed to effect the inching movements of the vehicle.

6 Claims, 3 Drawing Figures

BRAKE CONTROLLED PRESSURE MODULATING CLUTCH VALVE

BACKGROUND OF THE INVENTION

The present invention relates to a hydraulic control system for the fluid-actuated clutch engaging mechanisms of an industrial vehicle such as a forklift truck, and more particularly to an inching control system for controlling the fluid pressure to be supplied to the clutch engaging mechanisms in response to the braking operation.

Conventional inching control systems heretofore proposed are commonly provided with an inching valve operated responsive to the braking operation to regulate the fluid pressure applied to the clutch engaging mechanisms so as to effect the inching movements of the vehicle and independently a modulator valve for controlling line pressure from a fluid pressure source to be supplied to the clutch engaging mechanisms in manual shifting operation.

With the mentioned inching control systems, the function of the inching valve is affected by changes of the pressure value or the viscosity of the line pressure and the system must be complicated to realize shockless and smooth starts of the vehicle.

SUMMARY OF THE INVENTION

The prime object of the present invention is, therefore, to provide an inching control system for a vehicle, wherein a modulator valve for controlling the fluid pressure to be applied to the clutch engaging mechanisms is designed to effect the inching movements of the vehicle.

Another object of the present invention is to provide an inching control system for a vehicle, wherein the modulator valve is hydraulically regulated in response to the braking operation of the vehicle to have the inching movements.

Still another object of the present invention is to provide an inching control system for a vehicle, wherein the modulator valve is mechanically controlled in response to depression of a brake pedal of the vehicle.

A further object of the present invention is to provide an inching control system for a vehicle, wherein the modulator valve is regulated by the line pressure selectively applied therein in response to the braking operation of the vehicle.

Still further object of the present invention is to provide an inching control system for a vehicle, wherein the modulator valve is regulated by the hydraulic braking pressure to effect the inching control.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
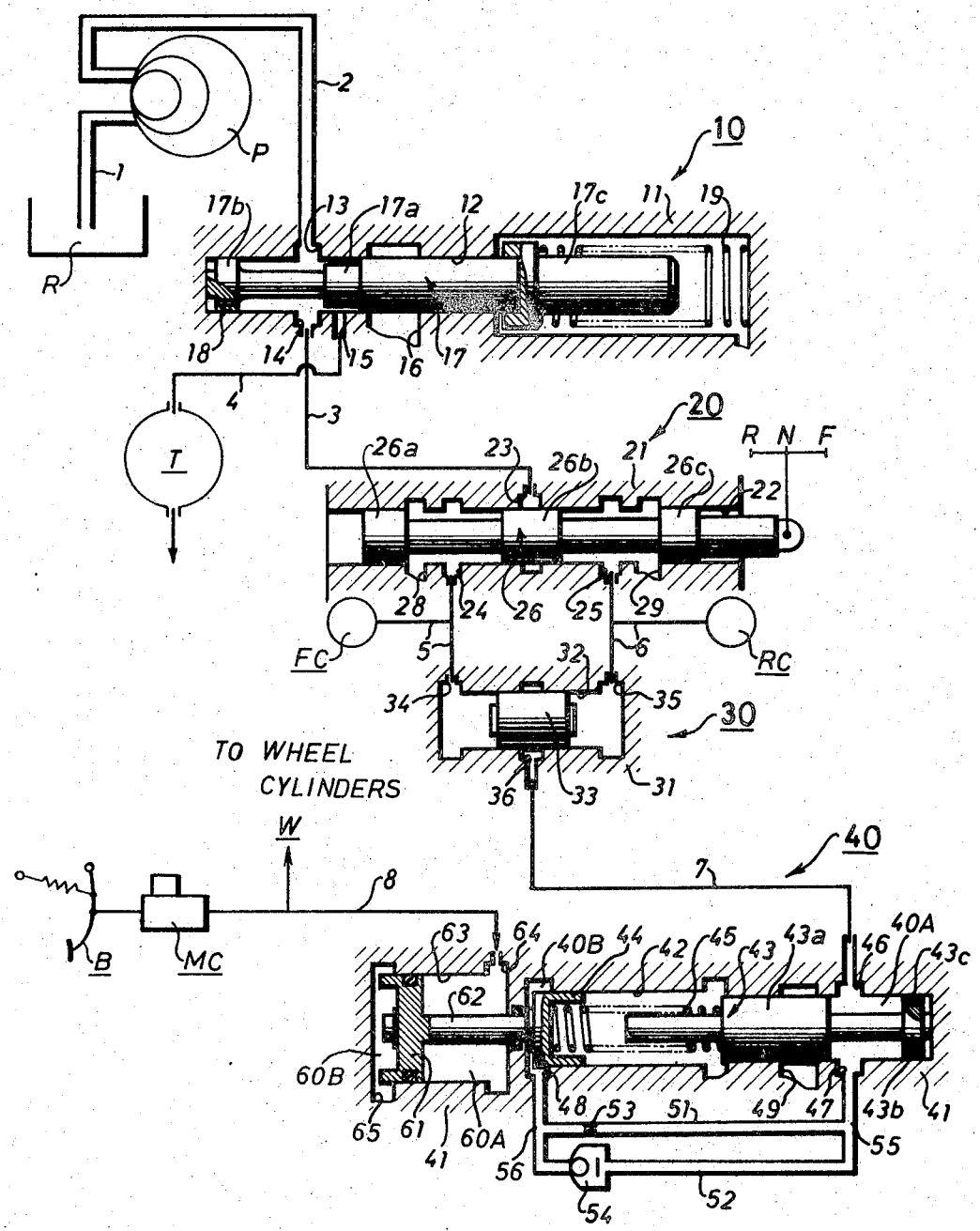
FIG. 1 shows schematically a view of the elevational cross-section of an embodiment of a hydraulic inching control system in accordance with the present invention.

Referring now to the drawings and more particularly to FIG. 1, there is illustrated a preferred embodiment of an inching control system for industrial vehicles such as a forklift truck and the like in accordance with the present invention. The system comprises a regulator valve 10 for regulating hydraulic pressure supplied by a hydraulic pump P to a predetermined value. The system further comprises a manual shift valve 20 to selectively connect the regulated line pressure from the regulator valve 10 through a conduit 3 with either of a forward or a reverse fluid-actuated clutch mechanism FC or RC respectively through conduits 5 or 6. A modulator valve 40 is further included in the control system for modulating the line pressure to be applied to the clutch engaging mechanisms FC and RC, the line pressure being applied to the modulator valve 40 through a conduit 7 selectively by way of a selector valve 30 in accordance with shifting operation of the manual shift valve 20.

The regulator valve 10 comprises a housing 11 provided with an inlet port 13 connected to the pump P through a conduit 2, outlet ports 14 and 15 respectively in communication with the conduit 3 and a conduit 4 leading to a torque convertor T and a drain port 16. In a cylindrical bore 12 of the housing 11, snugly engaged is a valve spool 17 having thereon lands 17a and 17b, the land 17b including a through hole 18 for permitting the fluid pressure to act on the left face thereof. The land 17a forms an annular orifice against the inner wall of the bore 12 at the outlet port 15. A compression coiled spring 19 is provided within the bore 12 for normally biasing the spool 17 leftward in the figure.

The manual shift valve 20 comprises a housing 21 provided with an inlet port 23 connected with the conduit 3 and outlet ports 24 and 25 respectively in communication with the conduits 5 and 6. Drain ports 28 and 29 are also provided on the housing 21. A spool valve 26 is snugly engaged within a cylindrical bore 22 of the housing 21 and provided with lands 26a, 26b and 26c.

With the above-mentioned construction, while the valve spool 26 of the shift valve 20 is conditioned to its neutral or N position, the land 26b of the spool 26 closes the inlet port 23 to block the supply of the fluid pressure from the regulator valve 10 to the shift valve 20. In this state, the fluid pressure pumped by the fluid pump P from a reservoir R through a conduit 1 is applied to the regulator valve 10 through the conduit 2 and the inlet port 13. The fluid pressure is applied in turn to the torque convertor J after reduced in value by the annular orifice at the outlet port 15. When the fluid pressure within the regulator valve 10 exceeds a predetermined value, the valve spool 17 is moved rightward in the figure against the biasing force of the spring 19 by the fluid pressure acting on the left face of the land 17b. Thus, the exceeding fluid pressure is discharged from the drain port 16 so that the fluid pressure to be applied to the shift valve 20 is regulated to constantly be in the predetermined value.

When the valve spool 26 is shifted to its forward or F position, communication is completed between the inlet port 23 and the first outlet port 24. Now, the line pressure from the regulator valve 10 is applied to the forward clutch engaging mechanism FC. At the same time, the line pressure flows through a conduit 5 into a first inlet port 34 of the selector valve 30. Upon shifting of the shift valve 20 to its reverse or R position, the inlet port 23 is connected with the second outlet port 25 and the line pressure from the regulator valve 10 is applied to the reverse clutch engaging mechanism RC. Simultaneously, the line pressure flows into a second inlet port 35 of the selector valve 30 by way of the conduit 6.

The aforementioned first and second inlet ports 34 and 35 of the selector valve 30 are provided on a housing 31 which includes thereon a common outlet port 36. The outlet port 36 is normally blocked by a valve spool 33 snugly engaged within a cylindrical bore 32 of the housing 31. In accordance with the displacements of the valve spool 33 by the line pressure, the outlet port 36 opens to the conduit 7 connected thereon and extending to an inlet port 46 of the modulator valve 40.

The modulator valve 40 comprises a housing 41 provided thereon with the inlet port 46, an outlet port 47, a drain port 49 and a port 48. The modulator valve 40 further comprises a valve spool 43 engaged within a cylindrical bore 42 of the housing 41, a coiled spring 45 normally biasing the valve spool 43 rightward in the figure and a modulator piston 44 positioned to the left end inside the bore 42, the spring 45 being placed between the spool 43 and the piston 44. The valve spool 43 is provided thereon with lands 43a and 43b. The land 43a closes the drain port 49 while the spool 43 is conditioned to its normal position. The land 43b is provided on the right end of the valve spool 43 and with a through hole 43c for leading the line pressure to the right face thereof.

The outlet port 47 is connected to a conduit 55 which diverges into first and second branch conduits 51 and 52 which merge into a conduit 56 connected to the port 48. The first branch conduit 51 includes therein an orifice 53. The second branch conduit 52 is provided therein with a one-way check valve 54 which opens at the conduit 56 side. The modulator piston 44 of the modulator valve 40 is connected with a rod 62 extending leftward into a bore 63 of the housing 41. The rod 62 is integrated with an inching piston 61 snugly engaged within the bore 63 to subdivide the bore 63 into a pressure chamber 60A and a drain chamber 60B. The pressure chamber 60A is connected to a braking circuit 8 through an inlet port 64, the circuit 8 including a master cylinder MC operated by a brake pedal B and wheel cylinders W.

Described below in detail is the operation of the modulator valve 40. In manual shifting operations of the shift valve 20, the spool 43 of the modulator valve 40 closes the drain port 49 with the land 43a thereof. In the initial stage of the shifting operation of the shift valve 20, therefore, the line pressure regulated by the regulator valve 10 is rapidly applied to either of the forward or reverse clutch engaging mechanism FC or RC. Simultaneously, the line pressure is applied to a first pressure chamber 40A formed by the valve spool 43. Thus, the valve spool 43 is moved leftward by the fluid pressure acting on the right face of the land 43b to open the drain port 49. In turn, the fluid pressure reduced in value by the orifice 53 acts on the left face of the modulator piston 44 by way of the outlet port 47, the conduits 51 and 56 and the port 48. The fluid pressure acting with a given time delay on the modulator piston 44 is conveyed to the valve spool 43 by way of the spring 45 thereby to modulate the leftward displacement of the valve spool 43. This creates modulated draining of the fluid pressure out of the drain port 49. Thus, the fluid pressure applied to either of the forward or reverse clutch engaging mechanism FC or RC is gradually increased. When the shifting operation of the shift valve 20 is completed, the valve spool 43 of the modulator valve 40 is returned to its original position as shown in the figure by the pressure difference between the pressure receiving areas of the modulator piston 44 and the valve spool 43, the pressure receiving area of the piston 44 being larger than that of the spool 43. Consequently, the drain port 49 is closed by the land 43a of the valve spool 43 so as to return the pressure value to the predetermined one within the clutch engaging mechanism to complete clutching operation.

After the completion of the clutch engagement, for instance with the manual shift valve 20 in its F position, the vehicle starts moving forward and increases the speed in accordance with the acceleration of the engine. Actuation of the brake pedal B to arrest the movement of the vehicle applies the braking fluid pressure into the pressure chamber 60A of the housing 41 through the inlet port 64, the conduit 8, and the master cylinder MC. The supplied fluid pressure displaces the inching piston 61 leftward and subsequently, the modulator piston 44 by way of the rod 62. This causes the release of the biasing force of the spring 45 acting on the spool 43 and the leftward displacement of the spool 43 to drain the fluid pressure within the first pressure chamber 40A from the drain port 49. At the same time, the pressurized fluid acting on the piston 44 within a second pressure chamber 40B formed by the piston 44 is rapidly returned into the first pressure chamber 40A through the conduit 56, the check valve 54, the conduits 52 and 55 and the port 47 and drained out from the drain port 49. The above pressure draining acts to lower the pressure value within the clutch engaging mechanism FC for completing the declutching operation.

Under the above mentioned state, the inching movement of the vehicle will be effected by releasing the brake pedal B to a proper extent. The release of the pedal B decreases the pressure within the pressure chamber 60A and the spool 43 starts to return rightward or its original position by the returning force of the spring 45 so as to close the drain port 49 with its land 43a in accordance with the release of the brake pedal B. Then, the clutching pressure is increased to effect loose engagement of the clutch engaging mechanism FC. The vehicle is forwarded by inching and arrested when the brake pedal B is again actuated. Repetition of the brake pedal actuating/releasing operation enables the desired inching movement of the vehicle. While the manual shift valve 20 is conditioned to its reverse position, the same operation enables the reverse inching movement of the vehicle.

Figure 2:
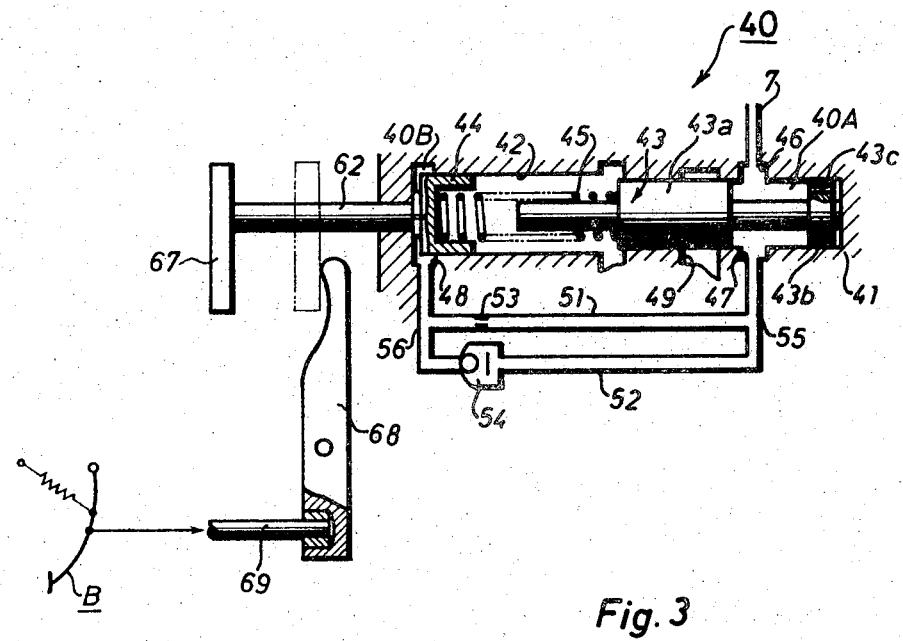
FIG. 2 depicts schematically a partial view of a modification of the system disclosed in FIG. 1.

Now reference is made to FIG. 2, wherein disclosed is a modification of the modulator valve 40 in the above mentioned embodiment. In this modification, the same and/or similar reference numerals and characters indicate the same and/or similar component parts and portions as in the first embodiment. The component feature in this instance is that the inching piston 61 of the first embodiment is replaced with a plate 67 integrally mounted on the left end of the modulator piston rod 62. The plate 67 engages an inching lever 68 which is operated by the brake pedal B by way of a connecting rod 69 one end of which is connected with a lower portion of the lever 68 and the other end of which is operatively connected with the brake pedal B. All other constructions remain unchanged from the first preferred embodiment and the same operation features and advantages are maintained.

Figure 3:
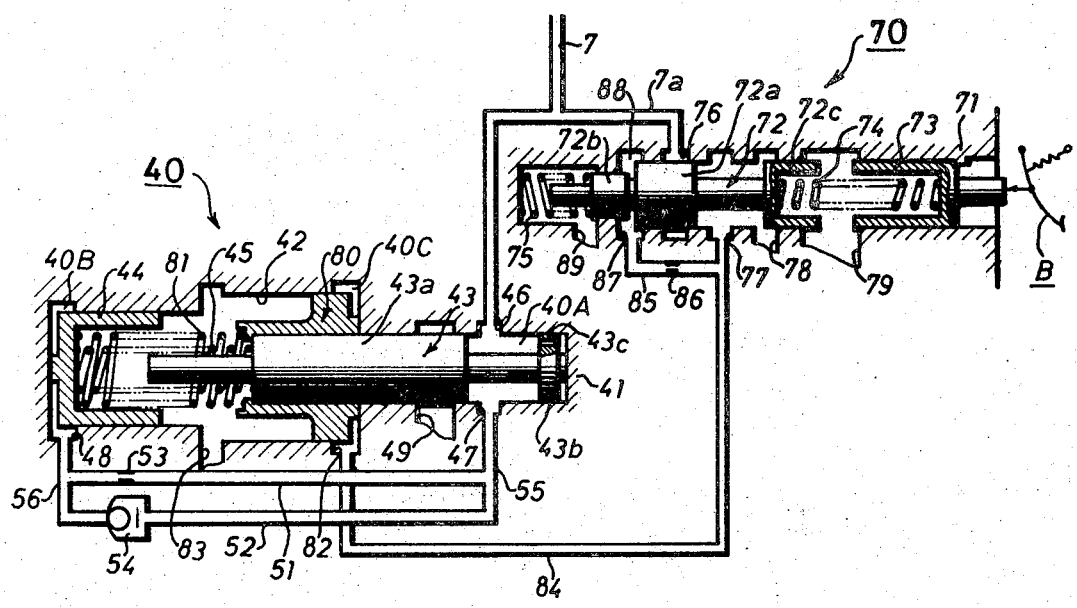
FIG. 3 is a schematical partial view of the elevational cross-section showing another embodiment of the present invention.

FIG. 3 illustrates a third preferred embodiment of the inching control system in accordance with the present invention, wherein the same and/or similar reference numerals and characters as in the first preferred embodiment are used to indicate the same and/or similar component parts and portions. The inching piston 61 of the first embodiment is replaced with an inching piston 80 snugly engaged within the cylindrical bore 42 of the modulator valve 40 and slidably coupled with the land 43a of the spool 43. This piston 80 forms at its right side a third pressure chamber 40C. The pressure chamber 40C is connected to a port 82 provided on the housing 41. A return spring 81 is interposed between the modulator piston 44 and the inching piston 80 so as to normally bias the inching piston 80 rightward.

In this third embodiment, an inching regulator valve 70 is adapted to apply the line pressure to be supplied into the first pressure chamber 40A to the inching piston 80 in accordance with the braking operation of the vehicle. The inching regulator valve 70 comprises a housing 71 including thereon an inlet port 76, an outlet port 77, a port 87 and drain ports 78, 79 and 89. The inlet port 76 is connected to the conduit 7 through a branch conduit 7a and the outlet port 77 is in communication with the inlet port 82 of the modulator valve 40 through a conduit 84. The outlet port 77 is also connected to the port 87 by a conduit 85 which includes therein an orifice 86. The inching regulator valve 70 further comprises a piston 73 operatively connected to the brake pedal B, a valve spool 72 reciprocable within a cylindrical bore of the housing 71, and a spring 74 disposed between the piston 73 and the spool 72. The spool 72 is provided with lands 72a, 72b and 72c and normally biased rightward in the figure by a spring 75, the land 72a normally closing the inlet port 76. Formed between the lands 72a and 72b is a pressure chamber 88 which opens to the port 87.

When the brake pedal B is actuated to arrest the vehicle with the manual shift valve 20 in its F or R position, the valve spool 72 of the inching regulator valve 70 is moved leftward and the inlet port 76 is connected to the outlet port 77, the drain port 78 being closed by the land 72c. The line pressure from the conduit 7 is supplied into the third pressure chamber 40C through the conduit 84 and the inlet port 82 to move the inching piston 80 leftward in the figure. And through the same process as explained in the first embodiment, the pressure within the pressure chambers 40A and 40B of the modulator valve 40 is discharged from the drain port 49 so as to effect the declutching operation of the clutch engaging mechanism FC or RC. At the same time, the line pressure is also supplied into the pressure chamber 88 through the conduit 85 and the inlet port 87 with a predetermined time delay due to the orifice 86. This will prevent undesired vibration of the spool 72.

When the brake pedal B is released for inching control of the vehicle, the piston 73 and the spool 72 of the inching regulator valve 70 are returned rightward by the springs 74 and 75. Then, the spool 72 starts closing the inlet port 76 and opening the drain port 78 to decrease the fluid pressure within the third pressure chamber 40C. Subsequently, the inching piston 80 returns rightward by the spring 81. Thus, the same process as described in the first preferred embodiment effect the loose engagement of the clutch engaging mechanism FC or RC for inching the vehicle. All other operations remain unchanged and no repetition will be made here.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. An inching control system for a vehicle having a manual shift valve for selectively supplying the line pressure from a pressure source of the vehicle at a predetermined value to fluid-actuated clutch engaging mechanisms and a hydraulic braking system for arresting the movements of the vehicle, comprising a modulator valve for modulating the line pressure to be supplied to said clutch engaging mechanisms responsive to the operation of said manual shift valve, said modulator valve including a housing, a valve spool reciprocable within a cylindrical bore of said housing and forming a first pressure chamber to be selectively connected with said clutch engaging mechanisms and to modulate the line pressure, a modulator piston reciprocable within said bore and forming a second pressure chamber which is directly connected with said first pressure chamber by a passage way having an orifice, said modulator piston being provided with a pressure receiving area which is larger than that of said valve spool and a resilient means interposed between said valve spool and modulator piston for normally biasing said valve spool to its inoperative position; and inching means directly connected to said modulating piston for controlling the movements of said modulator piston in response to the operation of said braking system to effect the inching movements of the vehicle, whereby the movements of said modulator piston regulate instantly the line pressure to be supplied into said clutch engaging mechanisms during the inching movements of the vehicle.

2. An inching control system as claimed in claim 1, wherein said inching means is a fluid actuator including an inching piston operated by pressurized braking fluid from said braking system, said inching piston being operatively connected with said modulator piston of said modulator valve.

3. An inching control system as claimed in claim 2, wherein said actuator comprises a casing mounted on said housing of said modulator valve, said inching piston reciprocable within said casing to form a pressure chamber to receive therein the pressurized braking fluid and an operation rod for connecting said inching piston with said modulator piston of said modulator valve.

4. An inching control system as claimed in claim 1, wherein said inching means comprises an inching plate to be mechanically operated by depression of the brake pedal of said braking system and an operation rod to connect said plate with said modulator piston of said modulator valve.

5. An inching control system as claimed in claim 1, wherein said inching means comprises an inching piston slidably and co-axially coupled with said valve spool within said bore of said modulator valve to form a third pressure chamber, a second resilient means interposed between said inching piston and modulator piston to urge said modulator piston against the fluid pressure applied into said second pressure chamber only when the line pressure to be supplied to said clutch engaging mechanisms is supplied into said third pressure chamber in accordance with depression of the brake pedal of said braking system and means for selectively communicating the line pressure to said third pressure chamber in response to the operation of said braking system.

6. An inching control system as claimed in claim 5, wherein said last mentioned communicating means comprises a conduit for communicating the line pressure to be supplied to said clutch engaging mechanisms into said third pressure chamber and an inching regulator valve disposed within said conduit to regulate the line pressure supplied into said third pressure chamber in response to the operation of said braking system.

* * * * *